United States Patent
Anderson et al.

(10) Patent No.: US 10,732,689 B2
(45) Date of Patent: Aug. 4, 2020

(54) CONTROLLING THE NUMBER OF POWERED VECTOR LANES VIA A REGISTER FIELD

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/638,407

(22) Filed: Jun. 30, 2017

(65) Prior Publication Data

US 2017/0308141 A1  Oct. 26, 2017

Related U.S. Application Data

(63) Continuation-in-part of application No. 14/326,928, filed on Jul. 9, 2014, now Pat. No. 10,175,981.
(Continued)

(51) Int. Cl.
*G06F 1/3234* (2019.01)
*G06F 1/28* (2006.01)
(Continued)

(52) U.S. Cl.
CPC .............. *G06F 1/28* (2013.01); *G06F 1/3206* (2013.01); *G06F 1/3243* (2013.01); *G06F 1/3287* (2013.01); *G06F 9/3013* (2013.01); *G06F 9/30014* (2013.01); *G06F 9/30018* (2013.01); *G06F 9/30036* (2013.01); *G06F 9/30072* (2013.01); *G06F 9/30109* (2013.01); *G06F 9/30112* (2013.01); *G06F 9/3887* (2013.01);
(Continued)

(58) Field of Classification Search
None
See application file for complete search history.

(56) References Cited

U.S. PATENT DOCUMENTS 5,774,702 A * 6/1998 Mitsuishi .................. G06F 1/08 713/501
5,996,083 A * 11/1999 Gupta .................... G06F 1/3203 713/322
(Continued)

*Primary Examiner* — Thomas C Lee
*Assistant Examiner* — Gary Collins
(74) *Attorney, Agent, or Firm* — Brian D. Graham; Charles A. Brill; Frank D. Cimino

(57) ABSTRACT

The vector data path is divided into smaller vector lanes. A register such as a memory mapped control register stores a vector lane number (VLX) indicating the number of vector lanes to be powered. A decoder converts this VLX into a vector lane control word, each bit controlling the ON of OFF state of the corresponding vector lane. This number of contiguous least significant vector lanes are powered. In the preferred embodiment the stored data VLX indicates that $2^{VLX}$ contiguous least significant vector lanes are to be powered. Thus the number of vector lanes powered is limited to an integral power of 2. This manner of coding produces a very compact controlling bit field while obtaining substantially all the power saving advantage of individually controlling the power of all vector lanes.

11 Claims, 9 Drawing Sheets

Related U.S. Application Data

(60) Provisional application No. 61/844,124, filed on Jul. 9, 2013.

(51) Int. Cl.
*G06F 13/26* (2006.01)
*G06F 9/30* (2018.01)
*G06F 1/3287* (2019.01)
*G06F 1/3206* (2019.01)
*G06F 9/38* (2018.01)

(52) U.S. Cl.
CPC ............ *G06F 13/26* (2013.01); *G06F 9/3004* (2013.01); *G06F 9/3016* (2013.01); *G06F 9/30105* (2013.01); *Y02D 10/171* (2018.01)

(56) References Cited

U.S. PATENT DOCUMENTS

| | | | | |
|---|---|---|---|---|
| 6,477,654 B1* | 11/2002 | Dean | ................ | G06F 1/3203 713/300 |
| 6,604,202 B1* | 8/2003 | Nishii | ................ | G06F 9/30145 712/208 |
| 6,839,828 B2* | 1/2005 | Gschwind | ........... | G06F 9/30043 712/20 |
| 9,009,506 B2* | 4/2015 | Fatemi | ................ | G06F 9/3836 713/320 |
| 10,133,577 B2* | 11/2018 | Corbal | ................ | G06F 1/3243 |
| 2005/0044434 A1* | 2/2005 | Kahle | ................ | G06F 1/3203 713/320 |
| 2005/0050372 A1* | 3/2005 | Hagiwara | ............ | G06F 1/3203 713/320 |
| 2006/0035683 A1* | 2/2006 | Miyazawa | .......... | H04W 52/028 455/574 |
| 2006/0155964 A1* | 7/2006 | Totsuka | ............. | G06F 9/30101 712/214 |
| 2006/0179329 A1* | 8/2006 | Terechko | ............. | G06F 1/3203 713/300 |
| 2006/0282826 A1* | 12/2006 | Dockser | ................ | G06F 1/206 717/127 |
| 2009/0313490 A1* | 12/2009 | Tani | .................... | G06F 1/3203 713/320 |
| 2011/0047349 A1* | 2/2011 | Hayashi | ............... | G06F 1/3203 712/22 |
| 2013/0268794 A1* | 10/2013 | Hancock | ................ | G06F 7/57 713/323 |

* cited by examiner

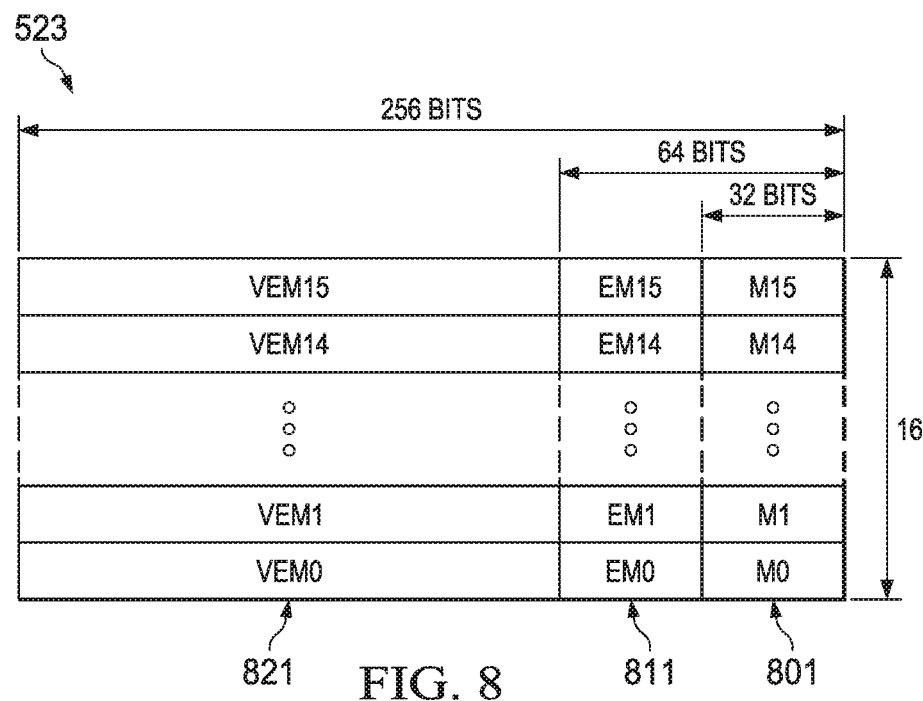
FIG. 8
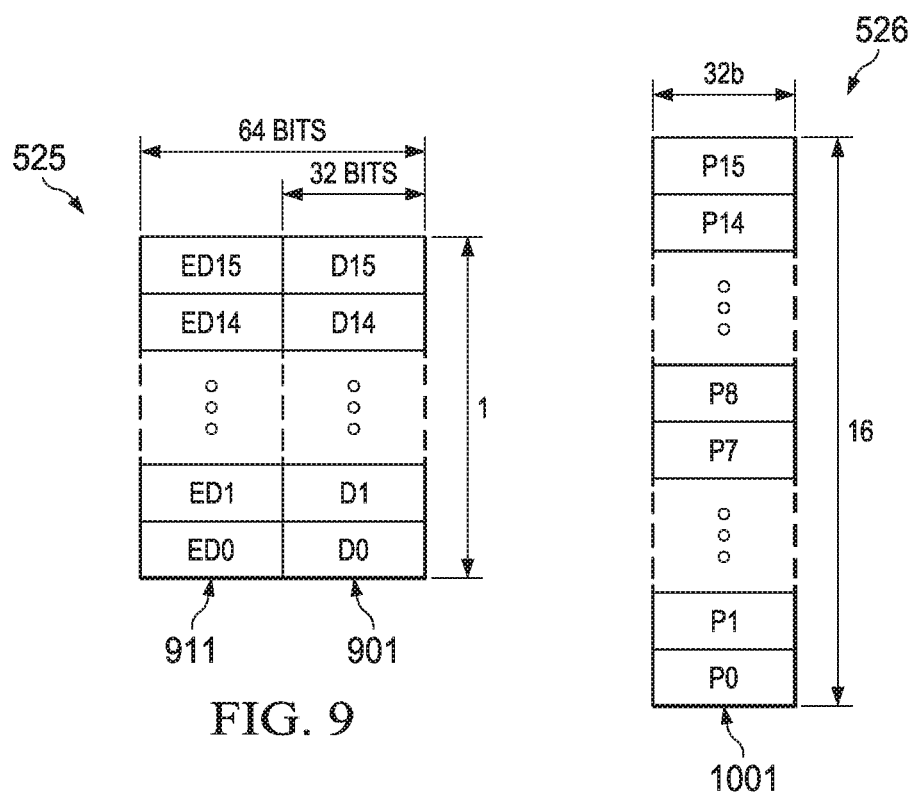
FIG. 9
FIG. 10

CONTROLLING THE NUMBER OF POWERED VECTOR LANES VIA A REGISTER FIELD

CLAIM OF PRIORITY

This application is a continuation-in-part of U.S. patent application Ser. No. 14/326,928 filed Jul. 9, 2013 entitled "METHOD TO CONTROL THE NUMBER OF ACTIVE VECTOR LANES FOR POWER EFFICIENCY" which claims priority under 35 U.S.C. 119(e) (1) to U.S. Provisional Application No. 61/844,124 filed 9 Jul. 2013.

TECHNICAL FIELD OF THE INVENTION

The technical field of this invention is digital data processing.

BACKGROUND OF THE INVENTION

Vector processors consume high amounts of power due to the wide data path width. A normal vector unit can only be turned ON or OFF in its entirety. Such a normal vector unit wastes power when executing smaller data width operations. This invention specifies a method to turn on and off a portion of the vector data path on the fly.

Power consumption may be minimized by dividing the vector data path width into smaller vector lanes. For example, a 256 bit vector data path may be divided into thirty-two 8-bit vector lanes. One or more up to all 32 of these vector lanes may be enabled for any particular instruction. There must be some manner of setting the number and identity of the vector lanes powered for any particular instruction.

Totsuka, U.S. Patent Application Publication No. 2006/0155964 published Jul. 13, 2006, teaches one prior art manner of identifying the vector lanes powered. Totsuka teaches a register stores data having one bit corresponding to each of the vector lanes of the vector data path. For each vector lane, 0 in the corresponding register location turns OFF power to that vector lane. A 1 in the corresponding register location turns ON power to that vector lane. Thus unused vector lanes may be powered OFF during a particular instruction operation saving power.

SUMMARY OF THE INVENTION

The vector data path is divided into smaller vector lanes. For instance, a 256-bit wide vector data path can be divided into thirty-two smaller 8-bit vector lanes. The invention allows the programmer to control the number of active vector lanes within a vector data path by writing into a control register field the number of active vector lanes.

A register such as a memory mapped control register stores a vector lane number (VLX). A decoder converts this VLX into a vector lane control word. Each bit of the vector lane control word corresponds to one of the vector lanes of the vector data path. The digital state of each vector lane control word bit controls the ON and OFF state of the corresponding vector lane. A prior art method stores one bit for each vector lane.

This invention provides as much flexibility as generally needed while requiring fewer stored bits than the prior art. In this invention the stored data indicates the number of vector lanes to be powered. This number of contiguous least significant vector lanes of the vector data path are powered. All other vector lanes are unpowered. This permits the stored data to require fewer bits.

An additional refinement realizes that it is not necessary to permit powering of every possible number of vector lanes. Data word sizes are typically on the order of $2^N$, where N is an integer. SIMD operations which may be performed on such vector processors often employ $2^P$ (where P is an integer) number of elements. Accordingly, it is often advantageous to control power to the vector processor to an integral power of 2 vector lanes rather than specifying all possible number of vector lanes. In the preferred embodiment the stored data VLX indicates that $2^{VLX}$ contiguous least significant vector lanes are to be powered. If the number of vector lanes required is not an integral power of 2, this invention powers the next greater integral power of 2 number of vector lanes. Except when more than half of the vector lanes are required, this still results in power saving over powering all vector lanes. This manner of coding produces a very compact controlling bit field while obtaining substantially all the power saving advantage of individually powering all vector lanes.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates a local register file of the load/store unit;

FIG. 10 illustrates the predicate register file;

DETAILED DESCRIPTION OF PREFERRED EMBODIMENTS

Figure 1:
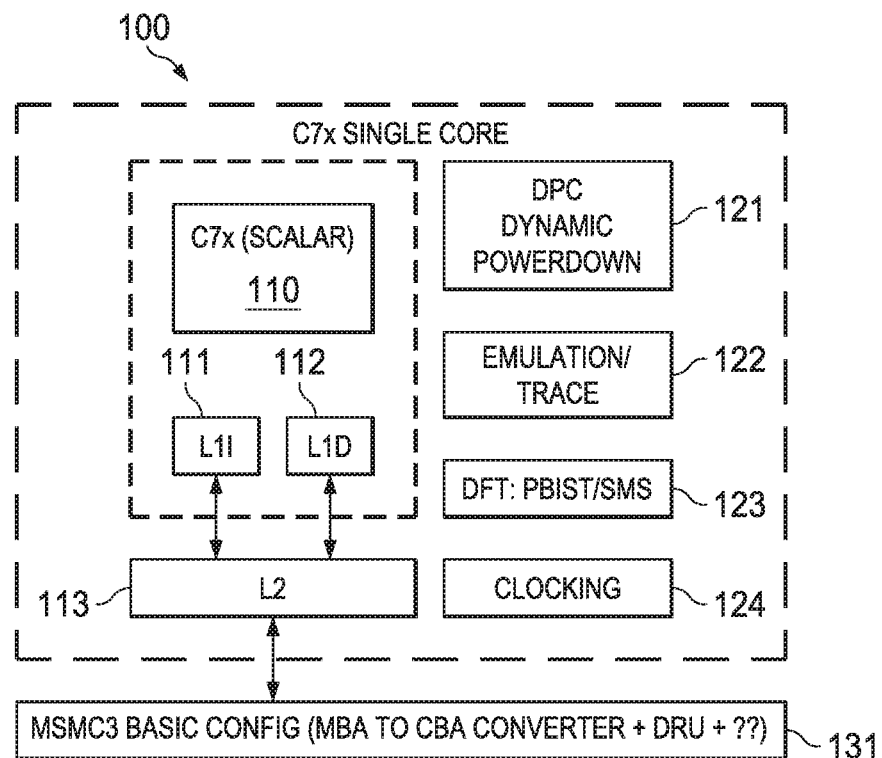
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
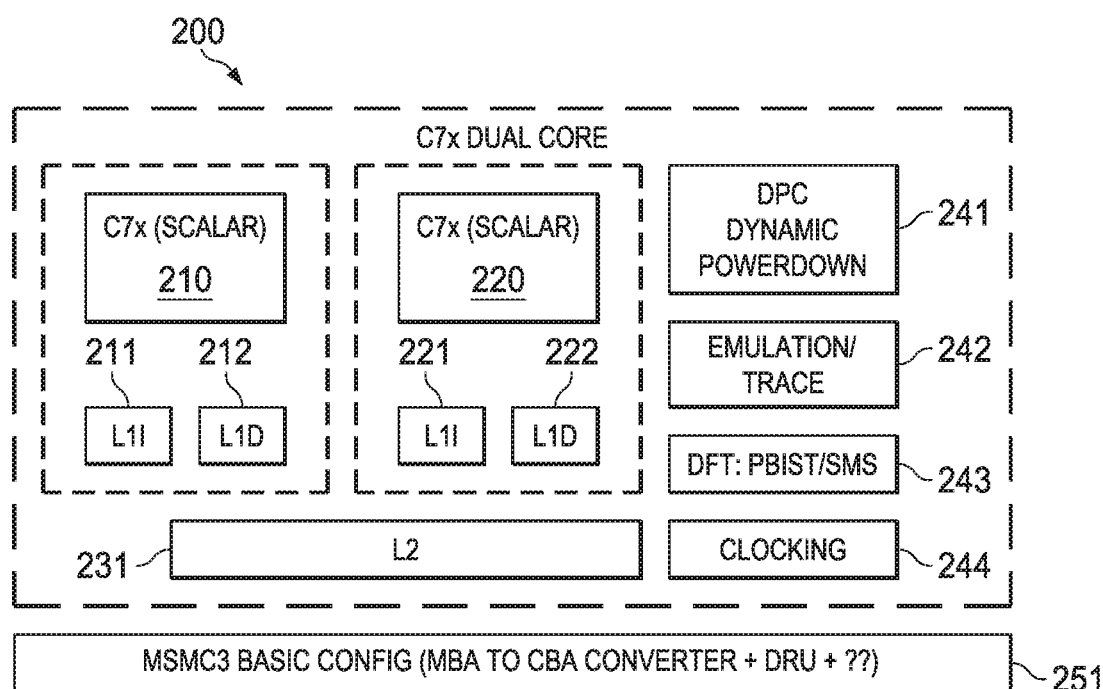
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
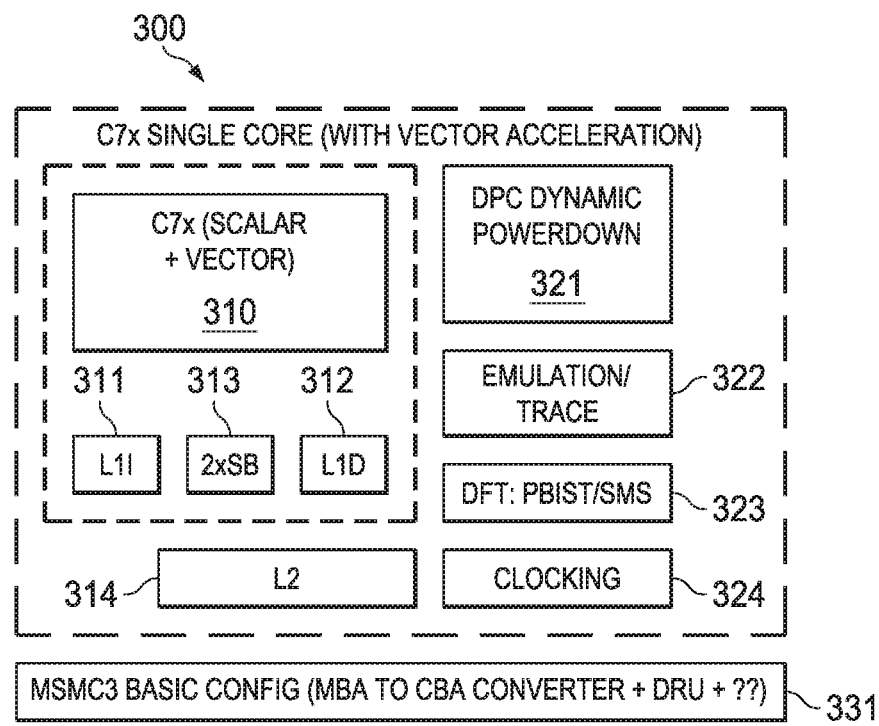
FIG. 3 illustrates a single core vector processor according to a further embodiment of this invention.
Figure 4:
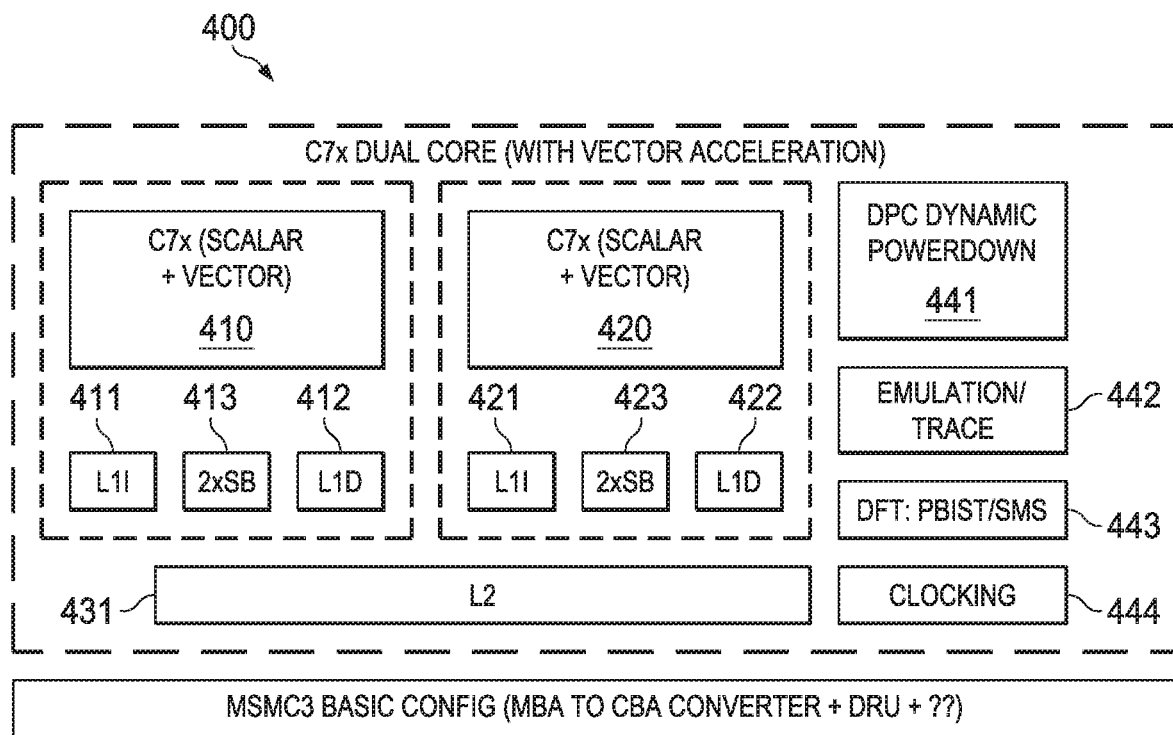
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
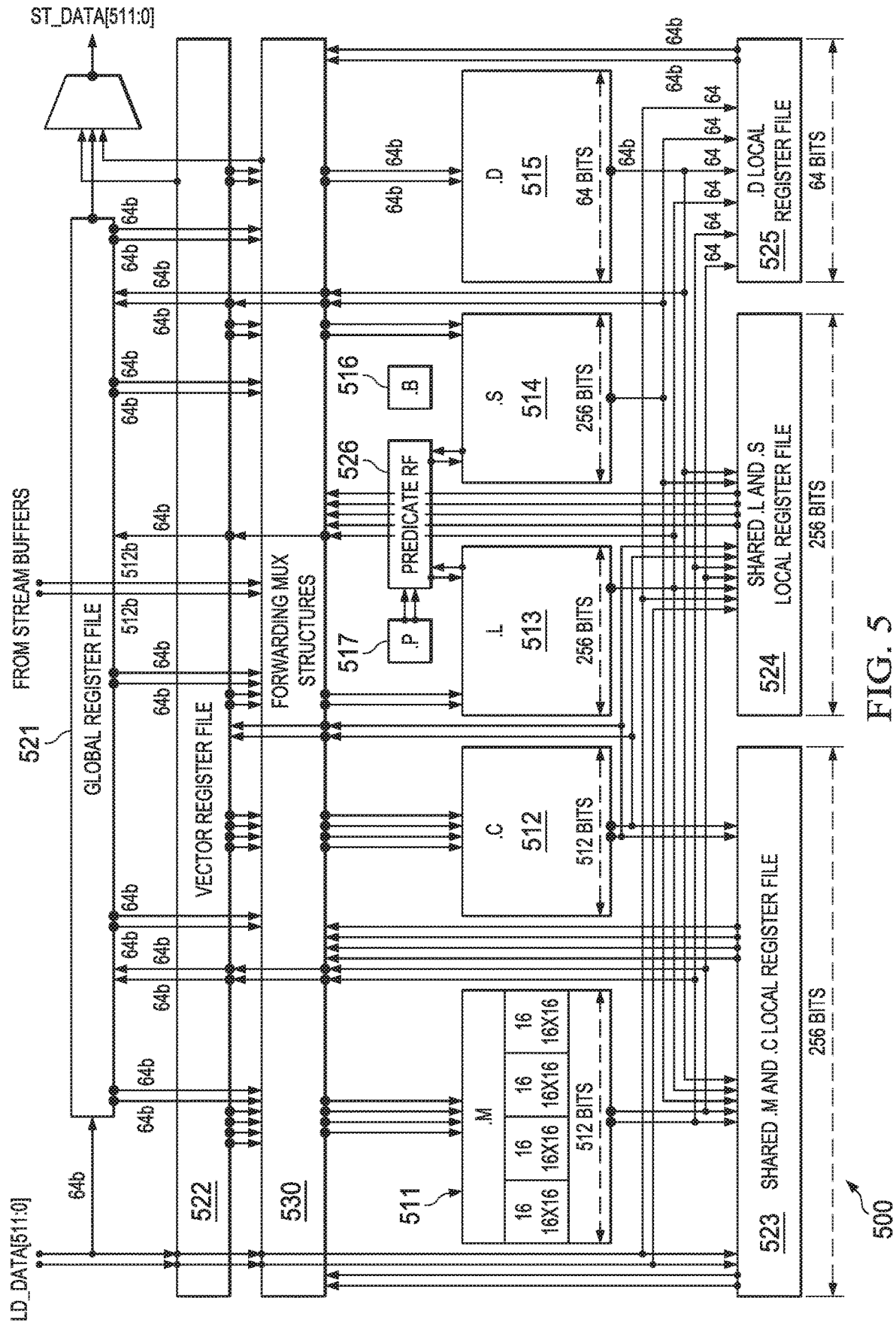
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and .C local register 523 file in a manner described below Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permute instructions. Correlation unit 512 includes 8 256-bit wide control registers. These control registers are used to control the operations of certain correlation unit instructions. Correlation unit 512 may access global scalar register file 521, global vector register file 522 and shared .M and .C local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various compare and minimum/maximum instructions which write results directly to predicate register file 526 (further described below). Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526 in a manner described below. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT, RMBD, BIT Decimate and Expand, etc.

Figure 6:
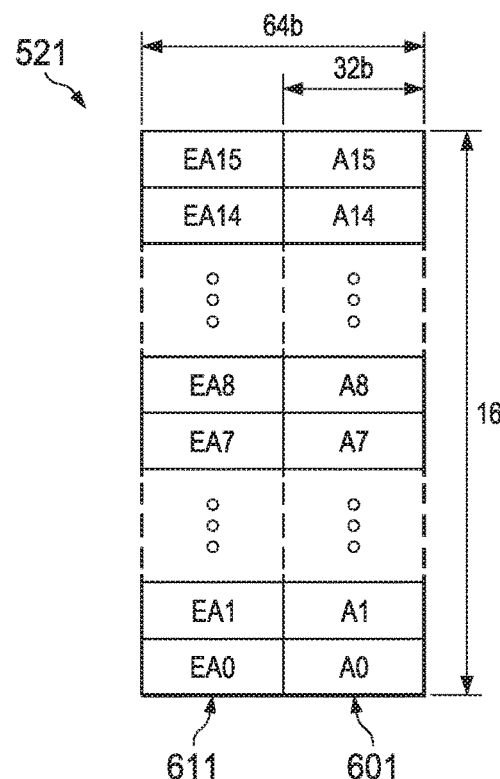
FIG. 6 illustrates a global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
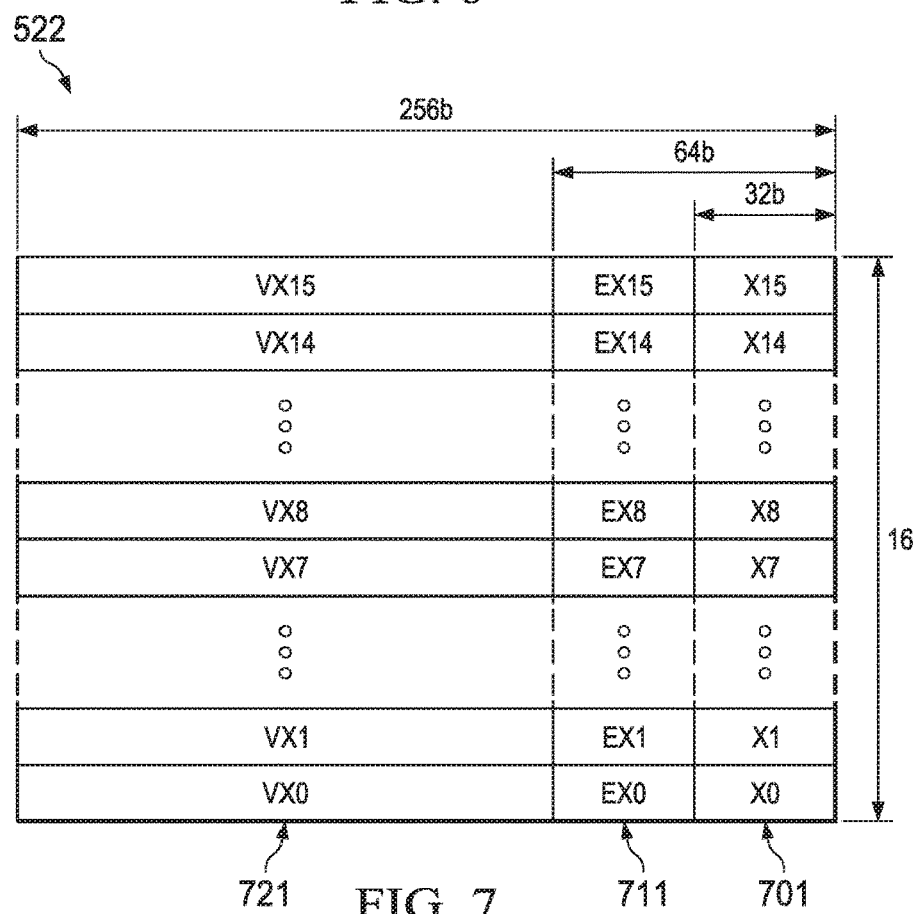
FIG. 7 illustrates a global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VM0 to VM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256 bit wide vector registers. Each register of local vector register file 524 can be read as 32-bits scalar data (designated registers L0 to L15), 64-bits of scalar data (designated registers EL0 to EL15) or 256 bit vector data (designated registers VL0 to VL15). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 526. There are sixteen registers 32-bit registers in predicate register file 526. Predicate register file 526 contains the results from vector comparison operations and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
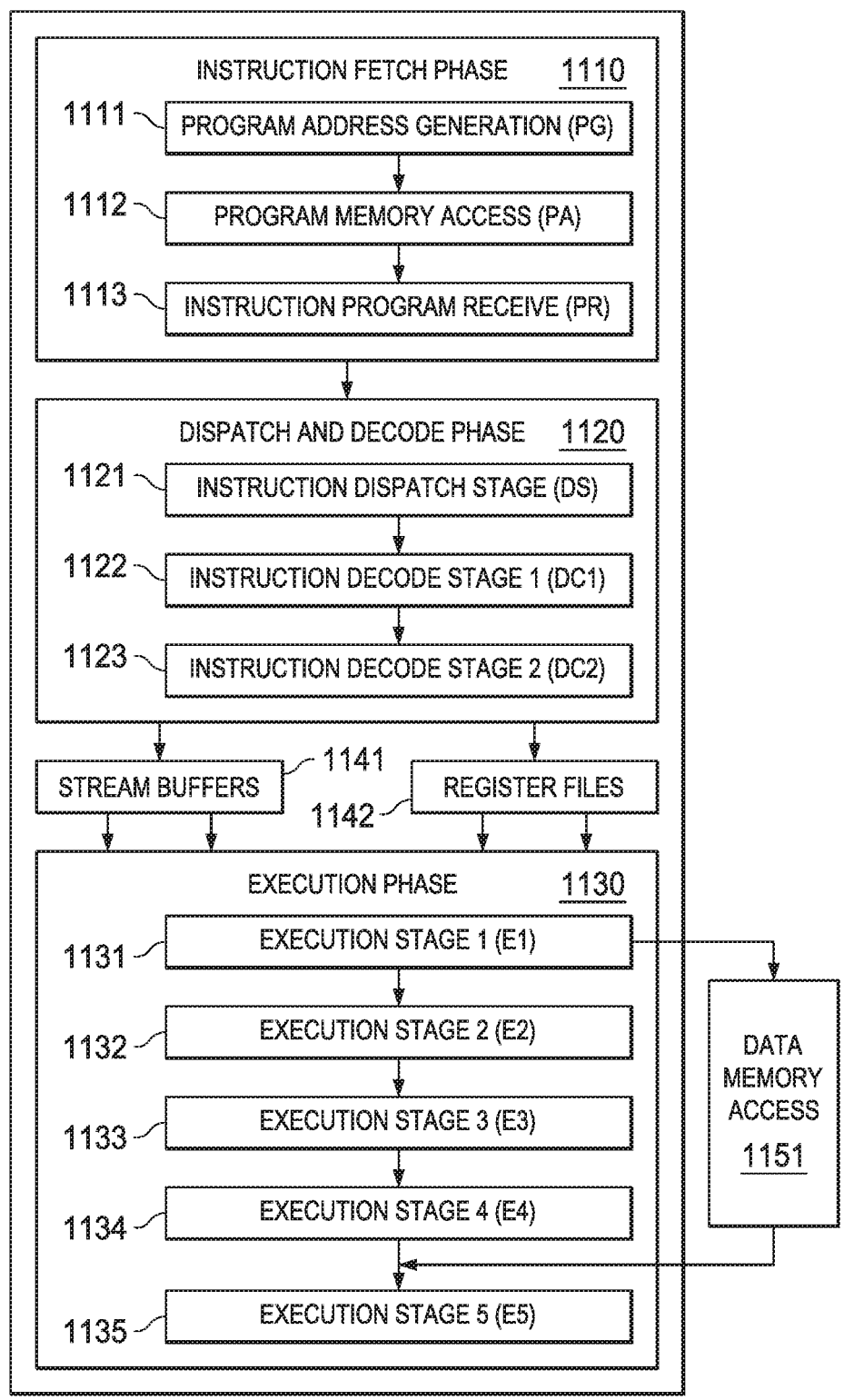
FIG. 11 illustrates the pipeline phases of a central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
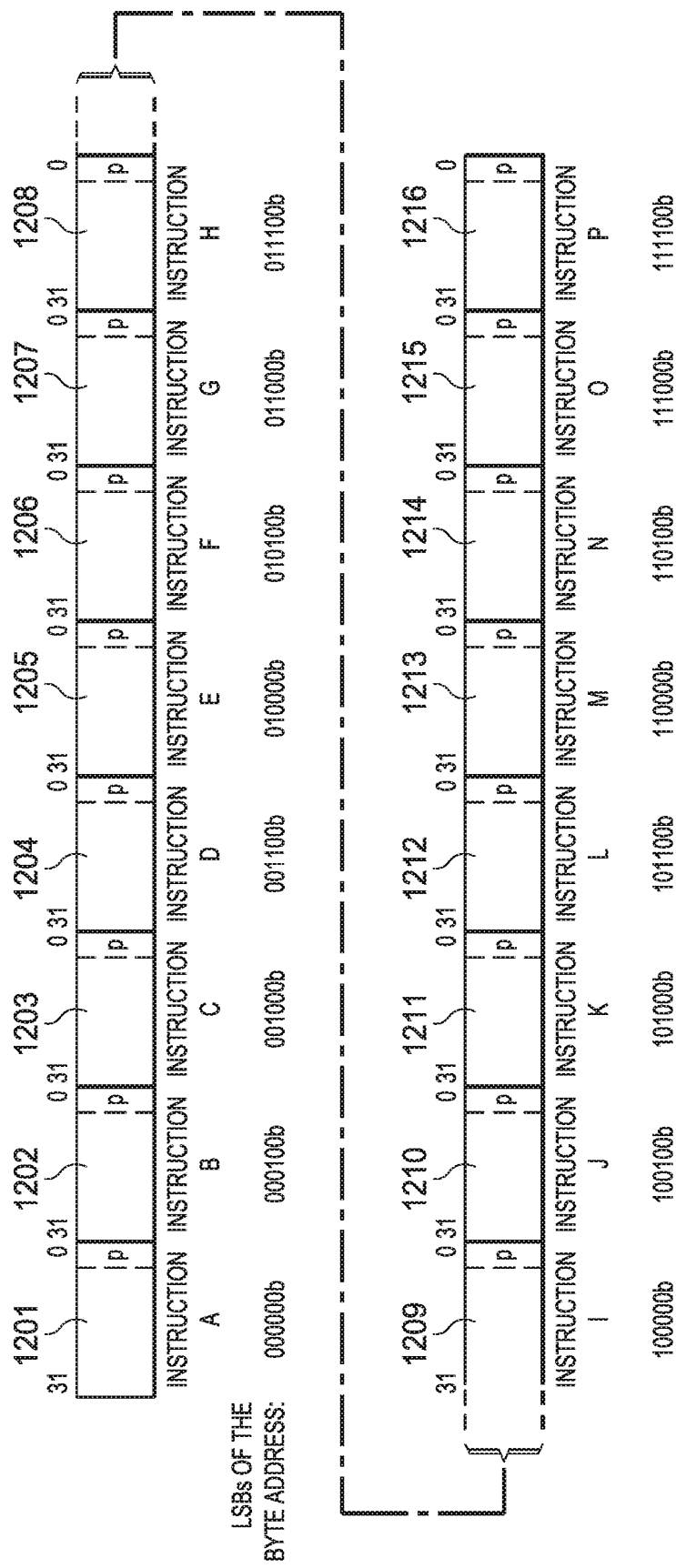
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in a control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
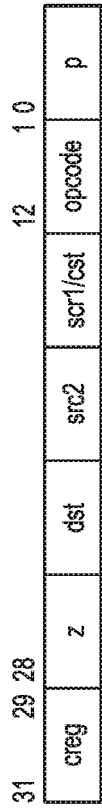
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515, branch unit 516 and predication unit 517). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

The dst field specifies a register in a corresponding register file as the destination of the instruction results.

The scr2 field specifies a register in a corresponding register file as the second source operand.

The scr1/cst field has several meanings depending on the instruction opcode field (bits 1 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Arithmetic units doing vector calculations operate on very wide data words, resulting in high power consumption. As an example, the embodiment shown in FIG. 5 implements 256 bit wide arithmetic units 513 and 514, and a 512 bit wide correlation unit 512. Not all operations are this wide. It may be that a particular instruction employs a data size less than the full data width of the functional unit. It may be that the number of SIMD elements to be processed by an instruction requires less than the full data width of the functional unit. Power usage efficiency suffers when a 256 bit wide arithmetic unit is used to operate on 64 bit wide operands or SIMD operands totaling 64 bits.

Power consumption may be minimized by dividing the vector data path width into smaller vector lanes. For example, a 256 bit vector data path may be divided into thirty-two 8 bit (1 byte) vector lanes. One or more up to all 32 of these vector lanes may be enabled for any particular instruction. There must be some manner of setting the number and identity of the vector lanes powered for any particular instruction.

Totsuka, U.S. Patent Application Publication No. 2006/0155964 published Jul. 13, 2006, teaches one prior art manner of identifying the vector lanes powered. Totsuka teaches a register stores data having one bit corresponding to each of the vector lanes of functional unit. For each vector lane, 0 in the corresponding register location turns OFF power to that vector lane. A 1 in the corresponding register location turns ON power to that vector lane. Thus unused vector lanes may be powered OFF during a particular instruction operation saving power.

This prior art could be improved in two aspects. First, the coding of one register bit per vector lane disadvantageously results in keeping a lot of data for each instruction. Second, the coding flexibility to selectively power any number of vector lanes also disadvantageously results in keeping a lot of data for each instruction.

This invention proposes a different manner of keeping the vector lane power control data than taught in Totsuka. In this invention the vector lane power control data in the register controls the number of powered vector lanes. Based upon the number indicated, the functional unit powers the indicated number of vector lanes. This invention provides power to a unique set of vector lanes for each indicated number. In the preferred embodiment the functional unit powers a number of contiguous least significant vector lanes indicated. Thus for register data corresponding to 1, the least significant vector lane is powered. For register data corresponding to 2, the two least significant vector lanes are powered, and etc. The vector lane selection flexibility of Totsuka may not be necessary. Careful data handling would provide the data in the predetermined vector lanes corresponding to the number of vector lanes powered. In the preferred embodiment vector lanes are powered from least significant toward most significant. This saves bit storage in the data determining which vector lanes are powered. According to Totsuka, if the functional unit is divided into 32 parts then 32 bits are needed to specify the vector lanes to power. In this invention only 6 bits are needed to specify the vector lanes to power. If M is the maximum number of vector lanes, then Totsuka requires M bits while this embodiment of the invention requires $\log_2(M)$ rounded up to the nearest integer bits, which is always fewer.

This invention includes an additional technique to reduce the number of bits required in the vector lane power control data. The technique of Totsuka permits powering any number of vectors lanes from 0 to the total number of vector lanes in the functional unit. This flexibility may not be needed. Data word sizes are typically on the order of $2^N$, where N is an integer. Common data sizes for data used in vector processors are 8 bits, 16 bits, 32 bits, 64 bits, etc. SIMD operations which may be performed on such vector processors often employ $2^P$ (where P is an integer) number of elements. Thus SIMD operations employ $2^{N+P}$ bits of the functional unit, where N is the data element size in bits and P is the number of SIMD data elements. Accordingly, it is often advantageous to control power to the vector processor to power $2^N$ vector lanes.

SIMD processing may not always employ an integral power of 2 number of elements. In this case this invention powers the next higher integer power of 2 number of vector lanes. Unless the number of needed vector lanes for this SIMD operation is more than half the maximum number of vector lanes, this invention results in some power savings over powering all vector lanes. If the number of needed vector lanes is not an integral power of 2, this invention will not achieve as much power savings as Totsuka. However, this invention requires much fewer stored bits. For the example of 32 selectively powerable vector lanes, Totsuka requires storing 32 bits. Employing this aspect of this invention requires only 3 bits (the next greater integer of $\log_2(\log_2 32)$). Using this technique 3 bits can control an integral power of 2 number of lanes up to 128.

Figure 14:
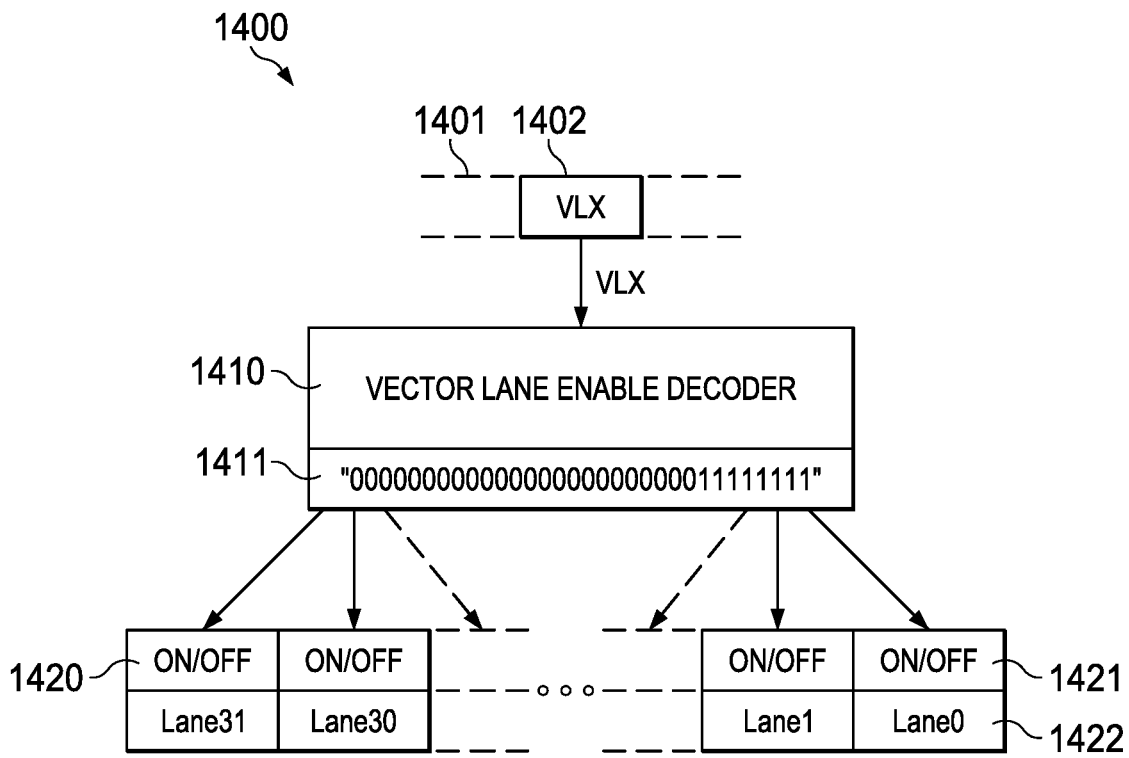
FIG. 14 illustrates a partial schematic diagram of a vector data path power control circuit.

FIG. 14 illustrates in partial block diagram form a circuit 1400 to practice one embodiment of this invention. Register 1401 includes a VLX (vector lanes number) field 1402 specifying the number of vector lanes to be powered. In this example VLX field 1402 includes 3 bits. In the preferred embodiment register 1401 is a memory mapped control register writable by a CPU such as vector CPU 310 in the single core vector processor 300 illustrated in FIG. 3 or one of the two vector CPUs 410 and 420 in the dual core vector processor 400 illustrated in FIG. 4. Dual core vector processor 400 may include separate registers 1401 for each of the two vector CPUs 410 and 420 or a single register 1401 shared by both vector CPUs 410 and 420. Register 1401 is preferably a task state register (TSR) for the processor storing the current state of processor on the current task. In the preferred embodiment the vector lane powering set by VLX field 1402 of this invention is applicable to all instructions of certain functional units, such as correlation unit 512 (.C), arithmetic unit 513 (.L) or arithmetic unit 514 (.S). As an alternative, powering selected vector lanes may be applicable only to specially coded instructions. In this alternative, all vector lanes are power for instructions not specially coded. The VLX field 1402 controls the number of powered vector lanes until changed. As an alternative, register 1401 may store an instruction (instruction register) and VLX field 1402 may be an instruction field. In this alternative the VLX field 1402 applies only to the containing instruction.

The data of VLX field 1402 (VLX) is supplied to the input of vector lane enable decoder 1410. Vector lane enable decoder 1410 outputs a vector lane power control word 1411 corresponding to the VLX input. For this embodiment of 32 vector lanes and a VLX field 1402 of three bits, vector lane enable decoder 1410 operates as shown in Table 4.

TABLE 4

| VLX | Number | $2^{VLX}$ | Control Word | | | | | | | |
|---|---|---|---|---|---|---|---|---|---|---|
| 000 | 0 | 1 | 0000 | 0000 | 0000 | 0000 | 0000 | 0000 | 0000 | 0001 |
| 001 | 1 | 2 | 0000 | 0000 | 0000 | 0000 | 0000 | 0000 | 0000 | 0011 |
| 010 | 2 | 4 | 0000 | 0000 | 0000 | 0000 | 0000 | 0000 | 0000 | 1111 |
| 011 | 3 | 8 | 0000 | 0000 | 0000 | 0000 | 0000 | 0000 | 1111 | 1111 |
| 100 | 4 | 16 | 0000 | 0000 | 0000 | 0000 | 1111 | 1111 | 1111 | 1111 |
| 101 | 5 | 32 | 1111 | 1111 | 1111 | 1111 | 1111 | 1111 | 1111 | 1111 |
| 110 | 6 | 64 | reserved | | | | | | | |
| 111 | 7 | 128 | reserved | | | | | | | |

Those skilled in the art would recognize vector lane enable decoder 1410 could be embodied by a look-up table having entries corresponding to the vector lane control words 1411 indexed by the data in VLX field 1402. In this example the number of vector lanes is 32, thus the VLX codings of 110 and 111 are not used. FIG. 14 illustrates an example vector lane control word "00000000000000000000000011111111" corresponding to a VLX field 1402 value of "011." In the alternative where VLX field 1402 is part of the instruction, vector lane enable decoder 1410 is part of instruction decoding.

The functional unit 1420 is illustrated schematically in FIG. 14. FIG. 14 omits the operand inputs and the output of functional unit 1420 for clarity of illustration of the invention. As illustrated schematically in FIG. 14, each bit of vector lane control word 1411 is supplied to a corresponding ON/OFF circuit 1421 of a corresponding vector lane 1422. When the vector lane control word 1411 bit is 1 the vector lane 1422 is powered. When the vector lane control word 1411 bit is 0 the vector lane 1422 is not powered. According to this example, the powered vector lanes are a set of contiguous least significant vector lanes. Also according to this example, the number of powered vector lanes is $2^N$, where N is an integer.

Figure 15:
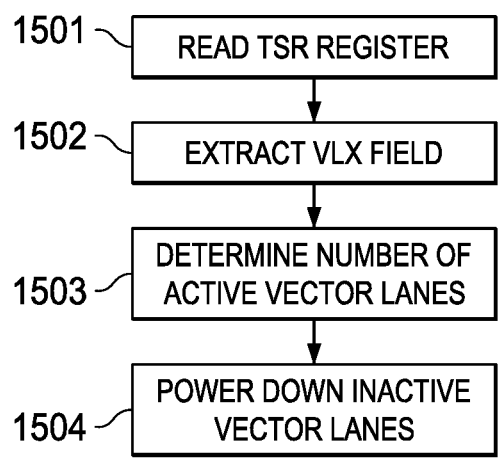
FIG. 15 illustrates a flow chart of one embodiment of the invention.

FIG. 15 illustrates the steps in this invention. Step 1501 reads a control register (TSR register) 1401. Step 1502 extracts the VLX field 1402 is extracted from the TSR register. Step 1503 determines the active vector lanes in use. This is preferably according to Table 4 above. The VLX field 1402 indicates the number of contiguous least significant vector lanes to power. This number of contiguous least significant vector lanes is $2^{VLX}$. Step 1504 then powers down the unused vector lanes. In the preferred embodiment these unpowered vector lanes are the most significant vector lanes.

Figure 16:
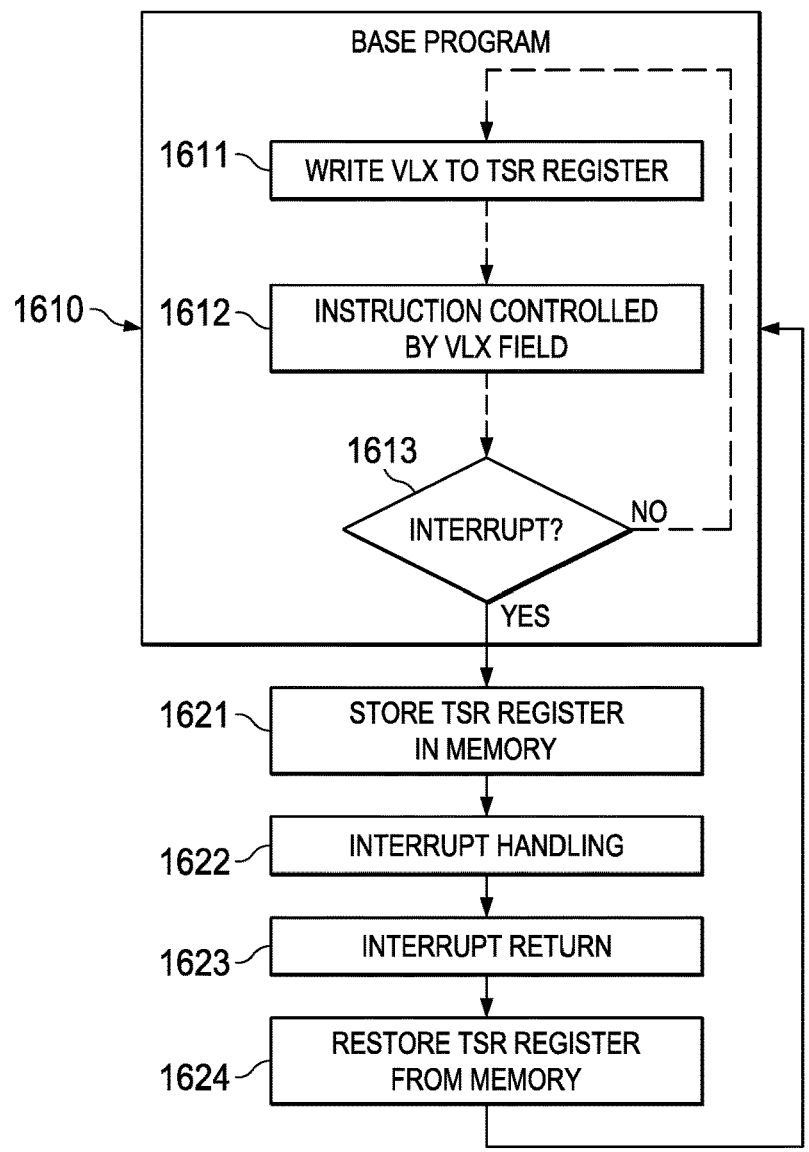
FIG. 16 is a flow chart illustrating how a vector lane number field in the task state register facilitates interrupt handling when the using selective vector data path powering of this invention.

Storing VLX field 1402 in the task state register (TSR register) 1401 facilitates interrupt handling when using selective vector data path powering. This is illustrated in FIG. 16. Typical operations occur in base program 1610. This includes writing to the VLX field 1402 in TSR register 1401 in step 1611. This also includes performing at least one instruction where the vector lanes powered are set by VLX field 1401 in step 1612. These steps are illustrated connected in dashed lines because other portions of base program 1610 are omitted for clarity of illustration.

Step 1613 tests to determine if an interrupt is received. Single core vector processor 300 and dual core vector processor 400 include conventional hardware to receive and service interrupts. If no interrupt is received, base program 1610 continues. If an interrupt is received, the processor stores TSR register 1401 to memory in step 1621. This preserves the prior status of the processor during the interrupt. VLX field 1402 is part of TSR register 1401, thus this data is preserved during the interrupt.

Step 1622 is the interrupt handling. This step preferably identifies the source of the interrupt and operates accordingly. Because the processor status stored in TSR register 1401 is preserved in memory, the interrupt handling of step 1622 may change and employ any resource of the processor. This includes the VLX field 1402, Upon completion of the interrupt handling (step 1622), the processor returns from the interrupt (step 1623). The priority task corresponding to the interrupt is finished and the processor may resume normal operation. This begins with restoring TSR register 1401 from the memory copy stored upon beginning the interrupt (step 1624). This returns the status of the processor to the state prior to the interrupt including the number of vector lanes to be powered on indicated by VLX field 1402. FIG. 16 symbolically illustrates the processor returning to base program 1620. Thus the interrupt handling (step 1622) may have changed the processor states including the number of vector lanes to be powered (VLX field 1402) but these states are recovered before base program 1610 resumes. With proper handling of plural copies of TSR register 1401, such a with a memory stack, nested interrupts are permitted. Each level of nested interrupt stores another copy of TSR register 1401 which it restores upon exit.

Figure 17:
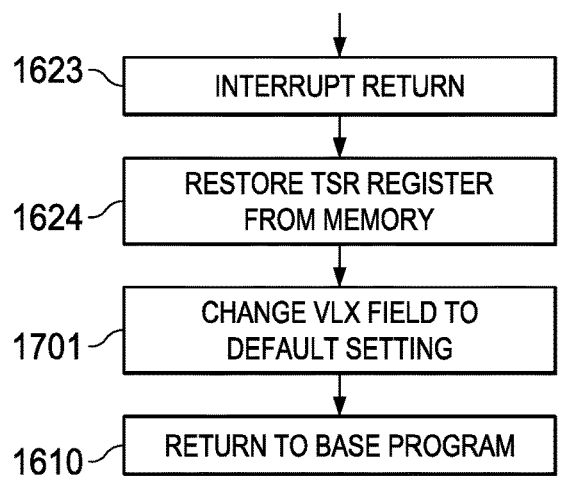
FIG. 17 is a flow chart illustrating another interrupt handling alternative.

FIG. 17 illustrates another interrupt handling alternative. In FIG. 17 upon completion of the interrupt handling (step 1622), the processor returns from the interrupt (step 1623). The processor restores TSR register 1401 from the memory copy stored upon beginning the interrupt (step 1624). These steps are the same as previously described in conjunction with FIG. 16. In this alternative, step 1701 places VLX field 1402 in a default state. This could be any valid state of VLX field 1402. Example of suitable valid VLX field 1402 states are: a state that powers a single vector lane; and a state that powers all vector lanes.

What is claimed is:

1. A digital data processor comprising:
   a register having a vector lane number field to store a vector lane number, wherein the vector lane number field includes a plurality of bits;
   a vector data path having a plurality of vectors lanes, wherein each of the vectors lanes is configured to be separately and selectively powered, and wherein the number of bits of the vector lane number field is less than the number of vector lanes of the vector data path;
   a decoder coupled to the register and to the vector data path, wherein the decoder is configured to receive the vector lane number from the register and to determine a vector lane control word corresponding to the vector lane number, wherein the vector lane control word includes a plurality of bits, the number of bits of the vector lane control word is equal to the number of vector lanes of the vector data path, the number of bits of the vector lane control word is greater than the number of bits decoded by the decoder to determine the vector lane control word, and each bit of the vector lane control word corresponds to a respective one of the vector lanes, wherein a number of vector lanes required is not an integer power of two and the decoder is configured to utilize a next higher integer power of two number of vector lanes; and control logic configured to control the powering of each of the vector lanes in response to the vector lane control word, wherein, for each vector lane, the vector lane is controlled to be power on if the bit of the vector lane control word corresponding to the vector lane has a first value and is controlled to be powered off if the bit of the vector lane control word corresponding to the vector lane has a second value.

2. The digital data processor of claim 1, wherein the vector lane number is a binary value represented by the number of bits of the vector lane number field, wherein each of a plurality of possible binary values that can be represented by the vector lane number corresponds to a respective decimal value M, and wherein the vector lane control word corresponding to the vector lane number causes $2^M$ vector lanes to be powered on.

3. The digital data processor of claim 2, wherein the $2^M$ vector lanes are contiguous vector lanes of the vector data path.

4. The digital data processor of claim 3, wherein the contiguous vector lanes are a contiguous group of least significant vector lanes of the plurality of vector lanes when $2^M$ is less than the number of vector lanes, and are all the vector lanes of the plurality of vector lanes when $2^M$ is equal to the number of vector lanes.

5. The digital data processor of claim 4, wherein the decoder includes a look-up table having a plurality of entries that include all possible vector lane control words indexed by a corresponding vector lane number.

6. The digital data processor of claim 5, wherein:
the vector lane number field consists of 3 bits;
the plurality of vector lanes includes 32 vector lanes; and
the plurality of entries of the look-up table includes:

| Vector Lane Number | Vector Lane Control Word | | | | | | | |
|---|---|---|---|---|---|---|---|---|
| 000 | 0000 | 0000 | 0000 | 0000 | 0000 | 0000 | 0000 | 0001 |
| 001 | 0000 | 0000 | 0000 | 0000 | 0000 | 0000 | 0000 | 0011 |
| 010 | 0000 | 0000 | 0000 | 0000 | 0000 | 0000 | 0000 | 1111 |
| 011 | 0000 | 0000 | 0000 | 0000 | 0000 | 0000 | 1111 | 1111 |
| 100 | 0000 | 0000 | 0000 | 0000 | 1111 | 1111 | 1111 | 1111 |
| 101 | 1111 | 1111 | 1111 | 1111 | 1111 | 1111 | 1111 | 1111. |

7. The digital data processor of claim 6, wherein the vector data path is 256 bits wide, and wherein each vector lane is 8 bits.

8. The digital data processor of claim 1, wherein all vector lanes powered on by the control logic are contiguous vector lanes within the vector data path.

9. The digital data processor of claim 1, wherein the first value is a logical 1 and the second value is a logical 0.

10. The digital data processor of claim 1, wherein each possible vector lane number corresponds to a unique vector lane control word.

11. The digital data processor of claim 1, comprising:
a first execution unit;
a second execution unit; and
a register file, wherein register file is coupled to each of the first execution unit and the second execution unit by the vector data path, and wherein the vector data path and the register file are arranged so that writing to the register file by the first execution unit and by the second execution unit is allowed over the vector data path, reading from the register file by the first execution unit is allowed over the vector data path, and reading from the register file by the second execution unit is not allowed over the vector data path.

* * * * *